Patented Mar. 3, 1925.

1,528,469

UNITED STATES PATENT OFFICE.

GLENN DAVIDSON, OF SEATTLE, WASHINGTON, ASSIGNOR TO I. F. LAUCKS, INC., OF SEATTLE, WASHINGTON.

METHOD OF MANUFACTURING PECTOUS EXTRACTS FROM FRUITS AND VEGETABLES.

No Drawing.      Application filed August 18, 1921. Serial No. 493,431.

To all whom it may concern:

Be it known that I, GLENN DAVIDSON, a citizen of the United States, and a resident of the city of Seattle, county of King, State of Washington, have invented certain new and useful Improvements in Methods of Manufacturing Pectous Extracts from Fruits and Vegetables, of which the following is a specification.

This invention relates to a new and useful method for the manufacture of pectous extracts from fruits or vegetables. It has as its primary object the preparation of a flavorless pectous extract, without processing or extracting in any way the fruit or vegetable pulp from which the extract is made previous to the extraction of the pectin.

Another advantage of my process is that the diffusion with water previous to the extraction of the pectin is entirely eliminated to which extent the operation of manufacturing the pectous extract is simplified from a mechanical standpoint.

A further advantage lies in the fact that during the alcoholic fermentation the coloring bodies of the pectous extract are partially destroyed and coagulated to such an extent that they are readily removed by filtration. The extract when ready for use will produce not only clear jelly but a water white jelly as well. Pectous extracts prepared by other methods do not yield as nearly a colorless jelly.

In carrying out my invention the fruit or vegetable is first ground to a pulp. If desired the pulp may be subjected to hydraulic pressure for the removal of the juices, whether or not this is done would depend upon the value of the juices so obtained and upon the amount of pectin which is carried out in solution in the juices. The last factor varying under different conditions as will be hereinafter explained.

The pectin is then extracted from the pulp with a dilute solution of acid (preferably acetic). The object in using the acid is to aid the following processes: (1) the inversion of any sucrose present to fermentable sugars, (2) the hydrolysis of suspended starch thereby rendering it soluble and thus making the extract more easily clarified, (3) the conversion of water insoluble pectose into water soluble pectin, that is, the solution of the pectous substances of the fruit or vegetable. The strength of the acetic acid solution must be low enough so that it will not materially hinder alcoholic fermentation. Ordinarily, it is about 0.07%–0.15%. I have found that, in practice, when a solution of this strength is used and the extract after fermentation finally concentrated in the proportion of ten or twelve to one, the acetic acid content of the concentrated extract will approximate 0.65%. This content of acetic acid is sufficient to materially retard alcoholic fermentation. That is, the acetic acid in the concentrated extract acts to a certain extent as a preservative. This is of considerable advantage in the case of pectous extracts packed for use of the housewife, since the extract will remain in perfect condition several weeks after the removal of the hermetical seal of the container.

The extract obtained as described above is allowed to ferment either with or without the addition of yeast. It is protected from air currents during the fermentation period in order to prevent the development of a large amount of acetic acid which would hinder alcoholic fermentation. After the fermentation process has proceeded as far as is desired, that is, after the sugars and natural flavoring compounds of the fruit or vegetable have been sufficiently destroyed, the alcohol is distilled off, the extract sterilized and then clarified by filtration. In most cases, the extract at this stage of the process will contain no appreciable amount of flavor of the fruit or vegetable from which it was prepared and may be used directly in the preparation of jams, jellies and marmalades or it may, if desired, be reduced in volume by evaporation previous to such use.

In some instances a small amount of the fruit or vegetable flavor persists after the fermentation process. This natural flavor may in all instances be completely removed by treatment with either saturated or superheated steam, either with or without vacuum, i. e., by a process closely resembling the ordinary commercial method for the deodorization of vegetable oils. If desired the pectous extract may be deodorized and largely deflavored by blowing with air. This may be done either hot or cold, either with or without vacuum or it may be done simultaneously with evaporation.

This method differs from other methods in use in that the pectous extract is treated for the removal of the sugars and natural flavoring compounds whereas other methods deflavor and desugar the entire pulp previous to the extraction of the pectin therefrom.

An idea of the great advantage in the use of my process may be gained in light of the following facts: In some fruits the pectin exists in solution in the juice. In other cases, particularly in the case of apples, the state of the pectin depends upon the ripeness of the fruit. In green apples the substance present is known as pectose and is insoluble in cold water. The pectose is hydrolyzed to water soluble pectin by boiling with water or dilute acid. Some of the methods now in use take advantage of this fact by removing the sugars and natural flavoring compounds by diffusion with water previous to the extraction of the pectin. As apples ripen the pectose is converted into water solution pectin in the ripening process. A large part of it goes into solution in the juice and most of the remainder is in a water soluble state so that if the sugars are removed by diffusion with water the pectin diffuses out also.

In case it is attempted to remove the sugars and natural flavoring compounds by processing (i. e. fermenting) the pulp previous to the extraction of the pectin it is exceedingly difficult to prevent other putrefactive processes which take place simultaneously with the alcoholic fermentation. These putrefactive processes impart to the mass of pulp and subsequently to the extract an unnatural and highly objectionable flavor. This flavor is exceedingly difficult to remove from the extract.

It is these difficulties which my invention circumvents. First, by the direct extraction of the pectin no loss is sustained due to diffusion. Thus my process is equally applicable to the preparation of pectous extracts from green or from ripe apples or, in general from fruits containing water insoluble pectose or from fruits containing water soluble pectin. Second, by the extraction of the pectin from the pulp previous to alcoholic fermentation and the protection of the extract from air currents during fermentation, all putrefactive processes other than alcoholic fermentation are eliminated together with their consequent bad flavors.

These features of my invention may possibly be better realized by consideration of the following specific instance. At present there is a very large tonnage of waste from our fruit canneries in the form of apple parings. In most instances these parings are from well ripened fruit. Under the present method it is not profitable to work this material for pectin due to the great loss of pectin incurred in desugaring and deflavoring the pulp by diffusion previous to making of the pectous extract. By the use of my method this material is all made available for the manufacture of high grade pectous extracts.

I have found that the length of time required for a jelly to set depends upon its acidity. That is, a jelly high in acid will set more rapidly upon cooling than a jelly containing a lower percentage of acid. Consequently, I control the length of time required for the jelly to set after cooling by varying the percentage acidity of the pectous extract. Further I have found that pectous substances vary in their ability to produce firm jellies depending upon several factors such as the kind of fruit, ripeness of the fruit, etc. However, in most cases firm jellies can be made from the weaker pectins by simply increasing the amount of pectin. Therefore, I propose to make a pectous extract of standard strength by varying the amount of pectin contained in it, the variation depending upon the jelly making strength of the pectin so as to produce a pectous extract which will in turn produce jellies of uniform strength regardless of the condition of the pectin. In case an acid is used to increase the acidity, which forms an insoluble calcium salt (e. g. tartaric), the insoluble calcium salt is precipitated in the pectous extract. If desired the precipitated salt may be removed either by settling or by filtering.

The reason for the preference placed upon acetic acid is the fact that with its use the pectin remains in better condition during the process of deodorization and concentration. That is, the pectin is less easily damaged and will stand higher temperature for more prolonged periods in the presence of acetic acid than in the presence of other acids or in the absence of all acids.

Further, I have found that jellies made with pectin and sucrose, "candy" or crystallize on the surface very rapidly when exposed to the air. This matter can be remedied by substituting invert sugar for the sucrose. That is, if a jelly is made from pectin invert sugar and water or fruit juice it will remain amorphous on the surface for a long period of time even when exposed to free circulation of the air.

Having thus described my invention, what

I claim as new therein and desire to secure by Letters-Patent, is:

1. A process for producing a flavorless pectous extract consisting in the extraction of the pulped fruit or vegetable with a dilute solution of acid, deflavoring the extract by alcoholic fermentation and finally clarifying it by filtration.

2. A process for producing a flavorless pectous extract consisting in the extraction of the pulped fruit or vegetable with a dilute solution of acid, deflavoring the extract by alcoholic fermentation and by treatment with steam and finally clarifying the extract by filtration.

3. A process for producing a flavorless pectous extract consisting in the extraction of the pulped fruit or vegetable with a dilute solution of acetic acid, deflavoring the extract by alcoholic fermentation and by treatment with steam, and clarifying the extract by filtration.

4. A process for producing a flavorless pectous extract nearly free from sugars in which the sugars present in the fruit or vegetable are fermented to alcohol, comprising effecting the alcoholic fermentation process in a vessel protected from air currents and distilling the alcohol formed during the fermentation process, whereby the remaining solution consists mainly of pectin.

5. A process of producing a flavorless pectous extract substantially free from sugars, comprising simultaneously extracting from the fruit or vegetable the pectous substance and the major part of the sugars, freeing the pectous substances from the remaining sugars by fermentation of the sugars to alcohol and recovering the alcohol and the pectous substances.

6. The process of producing a flavorless pectous extract substantially free from sugars, comprising simultaneously extracting from fruit or vegetable pulp the pectous substance and the major portion of the sugars by treatment with a dilute acid solution, treating the extraction product to eliminate the remainder of sugars, arresting the process before the pectous substance has started to decompose and treating the resulting product to recover the pectous extract.

7. The process of producing a flavorless pectous extract substantially free from sugars, comprising treating fruit or vegetable pulp with a dilute acid solution to simultaneously extract the pectous substance and the major part of the sugars, subjecting the extraction-product containing the remaining portion of the sugars to alcoholic fermentation, arresting said fermentation when substantially all of the sugars have been transformed but before the pectin has started to ferment and treating the extraction product to recover the pectous extract.

8. The process of producing a flavorless pectous extract substantially free from sugars, comprising treating fruit or vegetable pulp with a dilute acetic acid solution to simultaneously extract the pectous substance and the major part of the sugars, subjecting the extraction-product containing the remaining portion of the sugars to alcoholic fermentation, arresting said fermentation when substantially all of the sugars have been transformed but before the pectin has started to ferment and clarifying the fermentation product.

9. The process of producing a flavorless pectous extract substantially free from sugars, comprising extracting the juices from fruit or vegetable pulp, separating the extraction liquid therefrom, treating the remaining pulp mass with a dilute acetic solution to simultaneously extract the pectous substance and the major part of the sugars, subjecting the extraction product containing the remaining portion of the sugars to alcoholic fermentation, arresting said fermentation when substantially all of the sugars has been transformed but before the pectin has started to ferment, and treating the fermentation product to recover the pectous extract.

10. The process of producing a flavorless pectous extract substantially free from sugars, comprising extracting the juices from fruit or vegetable pulp, separating the extraction liquid therefrom, treating the pulp mass with a dilute acetic acid solution varying in strength between .07 to .15% to simultaneously extract the pectous substance, and the major part of the sugars, subjecting the extraction-product containing the remaining portion of the sugars to alcoholic fermentation, arresting said fermentation when substantially all of the sugars have been transformed but before the pectin has started to ferment and treating the fermentation product to recover the pectous extract.

11. The process of producing a flavorless pectous extract substantially free from sugars, comprising treating fruit or vegetable pulp with a dilute acid solution insufficient to materially retard alcoholic fermentation, to simultaneously extract the pectous substance and the major part of the sugars; subjecting the extraction product containing the remaining portion of the sugars to alcoholic fermentation; arresting said fermentation when substantially all of the sugars have been transformed but before the pectin has started to ferment; treating the fermentation product to recover the pectous extract; and concentrating the latter to such a degree that its acid content acts as a preservative.

12. The process of producing a flavorless pectous extract substantially free from sugars, comprising extracting the juices from fruit or vegetable pulp, separating the extraction-liquid therefrom, treating the pulp mass with a dilute acetic acid solution varying in strength from .07 to .15% to simultaneously extract the pectous substance and the major part of the sugars, subjecting the extraction product containing the remaining portion of the sugars to alcoholic fermentation, arresting said fermentation when substantially all the sugars have been transformed but before the pectin has started to ferment, treating the fermentation product to recover the pectous extract and concentrating the latter until its acetic acid content is .65%.

Signed at Seattle, Washington this 6th day of July, 1921.

GLENN DAVIDSON.